United States Patent Office 3,423,557
Patented Jan. 21, 1969

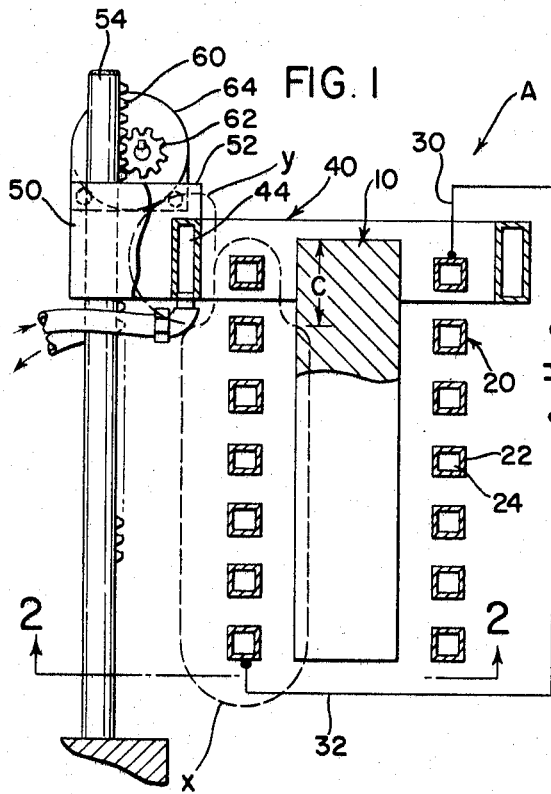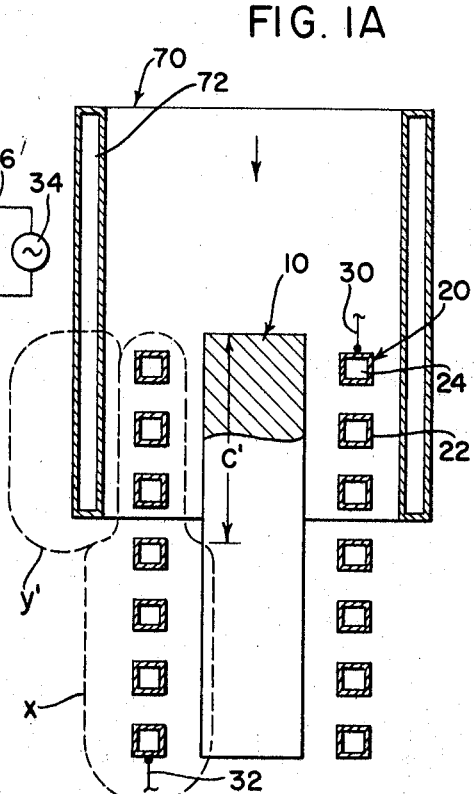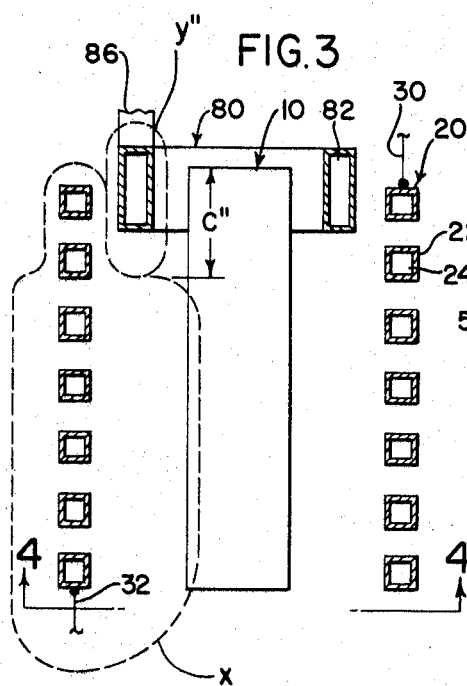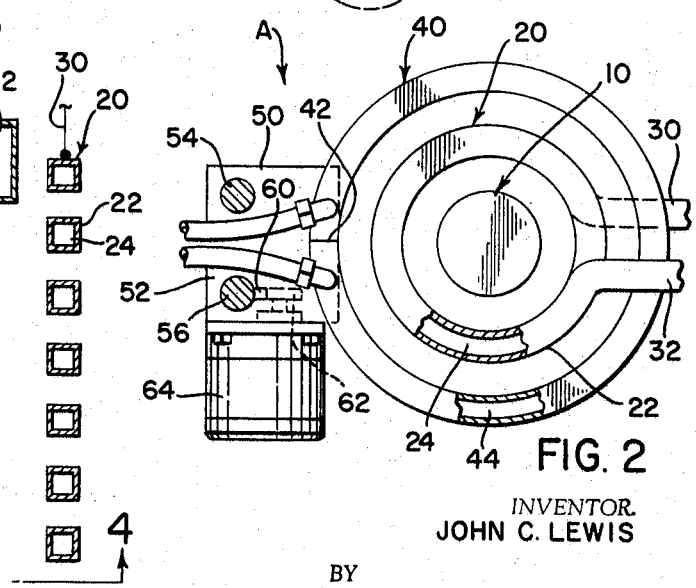

1

3,423,557
DEVICE FOR MOVING A COOLED ZONE THROUGH AN INDUCTIVELY HEATED WORKPIECE
John Charles Lewis, Hamilton, Wentworth, Ontario, Canada, assignor to The Ohio Crankshaft Company, Cleveland, Ohio, a corporation of Ohio
Filed May 9, 1966, Ser. No. 548,775
U.S. Cl. 219—10.75         5 Claims
Int. Cl. H05b 5/00

ABSTRACT OF THE DISCLOSURE

An induction heating installation for heating a workpiece, such as a semi-conductive material, and progressively cooling the workpiece. An induction heating coil surrounds the workpiece and a conductive ring concentric with the coil is moved along the coil for progressing a cooled zone along the workpiece.

---

The present invention pertains to the art of induction heating and more particularly to a device for moving a cooled zone through an inductively heated workpiece.

The invention is particularly applicable for purifying or modifying a semi-conductive material and it will be described with particular reference thereto; however, it will be appreciated that the invention has broader applications and may be used in other environments wherein a cooled zone must be passed progressively through a workpiece being heated.

In production of certain semi-conductive materials, it has become somewhat common practice to purify or modify the materials by slowly moving an energized inductor along an elongated workpiece formed from this material, with the workpiece being held stationary or rotated slowly. This arrangement has met with certain success; however, it has been found that in some materials better results are obtained by heating the semi-conductive material workpiece to a selected temperature and then slowly moving a controlled cooled zone axially along the workpiece. Apparatus for performing this function have been complicated because they involved complex electrical systems for creating and moving the cooled zone.

This disadvantage of prior known apparatus for moving a cooled zone axially through an elongated workpiece has been overcome by the present invention which provides a relatively simple mechanical arrangement for creating and moving the cooled zone.

In accordance with the present invention, there is provided an improvement in a device for inductively heating an elongated workpiece, which device comprises a stationary inductor surrounding the workpiece and having input leads and a high frequency power supply connected across the input leads for energizing the inductor to heat the workpiece along its length. In accordance with the present invention, the above induction heating device is modified by providing an electrically conductive ring forming a low impedance path. This ring is telescopically mounted with respect to the coil, spaced radially from the coil, and directly coupled magnetically to the coil. There is also provided means for progressively moving the ring coaxially along the workpiece to progress a cooled zone along the length of the workpiece at a controlled rate. The ring does not contact either the coil or the workpiece.

In accordance with the above defined invention, the induction heating coil maintains the workpiece in a heated condition. By moving the ring slowly along the coil, the flux generated by current flow through the coil is offset by the flux field created by the induced current flow within the conductive ring. Consequently, in the workpiece area immediately adjacent the area of the coil influenced by the ring there is a lesser flux field for heating the workpiece. This creates, without complicated electrical circuits or components, a cooled zone or a zone having a lesser heating effect. This zone is progressed along the length of the workpiece as the ring is moved along the coil. The concept of creating a cooled zone by a ring which reduces the flux field adjacent a certain portion of an induction heating coil and then moving the cooled zone progressively along the workpiece is novel in the art of induction heating.

The primary object of the present invention is the provision of a device for moving a cooled zone axially along the length of a heated workpiece, which device is inexpensive to produce and dependable in operation.

Another object of the present invention is the provision of a device for moving a cooled zone axially along the length of a heated workpiece, which device does not require complicated electrical circuits or components to create and move the cooled zone.

Still another object of the present invention is the provision of a device for moving a cooled zone axially along the length of a heated workpiece, which device can be produced by modifying existing induction heating equipment. This is a substantial benefit because the electrical characteristics and principle of the commonly used induction heating equipment are well known in the art.

These and other objects and advantages will become apparent from the following description used to illustrate the preferred embodiment of the invention as read in connection with the accompanying drawings in which:

FIGURE 1 is a side plan view, in cross-section, showing, somewhat schematically, the preferred embodiment of the present invention;

FIGURE 1A is a side plan view, in cross-section, illustrating, somewhat schematically, a modification of the embodiment of the invention shown in FIGURE 1;

FIGURE 2 is an end view taken generally along line 2—2 of FIGURE 1;

FIGURE 3 is a partial cross-sectional view illustrating, somewhat schematically, another modification of the present invention;

Figure 4:
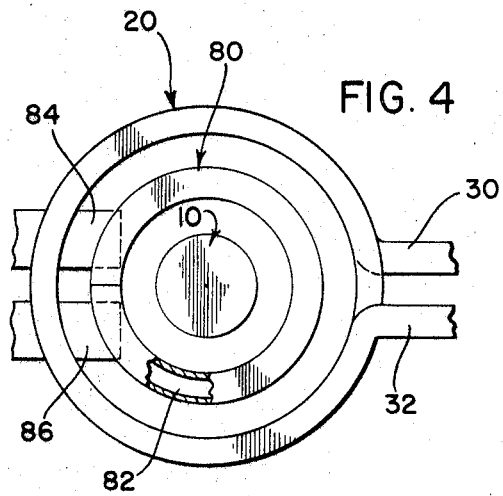
FIGURE 4 is an end view taken generally along line 4—4 of FIGURE 3.

Referring now to the drawings wherein the showings are for the purpose of illustrating preferred embodiments of the invention only and not for the purpose of limiting same, FIGURES 1 and 2 show an apparatus A for passing a cooled zone C axially along a workpiece 10 being inductively heated. Apparatus A includes a multi-turn induction heating coil 20 surrounding the workpiece for a major portion of its length. This coil includes a conductor 22 with a central coolant passage 24. Input leads 30, 32 of the coil are connected across a high frequency source, schematically represented as a generator 34. To correct the power factor of the heating installation, in accordance with normal practices, a power factor correcting capacitor 36 is connected across the input leads 30, 32.

Coil 20 is supported with respect to thhe workpiece by an appropriate structure, not shown. When the inductor is energized, the workpiece, which is preferably an elongated piece of semi-conductive material to be purified, modified or otherwise changed by progressing the cooled zone C axially along its length, is heated by known induction heating principles. The temperature of the workpiece may be controlled by varying the power to the inductor 20 or by changing the spacing of the inductor with respect to the workpiece.

In accordance with the invention, the cooled zone C is provided by a ring 40 formed from a highly conductive material, such as copper, and telescopically received around the coil 20. This ring is electrically connected at a junction 42 to form a low impedance path, and it includes an internal coolant passage 44. Spaced supports 50, 52 mount the ring 40 for movement axially along the coil. The supports 50, 52 are reciprocally mounted on upwardly extending posts 54, 56, respectively. Post 56 includes an outwardly extending rack sector 60 that coacts with a pinion 62 driven by an electric motor 64. Rotation of the pinions by the motor, upon receipt of a signal, moves the ring 40 downwardly along the coil so that the cooled zone C is progressed at a slow rate along the length of the heated workpiece 10.

As shown in FIGURE 1, the cooled zone C is created by distorting or cancelling the normal flux field $x$ created by current flow in coil 20. Coil 20 induces a current flow around the ring 40 which current flow creates an opposing flux field $y$. Flux field $y$ opposes the flux field $x$ of the coil in the vicinity of the ring 40. This decreases the flux field $x$ and creates a heating effect within the workpiece which is substantially reduced from the normal heating effect created by the field $x$. In this manner, the cooled zone C is created by ring 40. The rate at which the ring is moved along the coil is determined empirically to provide the desired effect upon the workpiece 10. It is appreciated that the ring 40 may be progressed in either direction along the coil by changing the direction in which motor 64 is rotating. In addition, sometimes it is advisable to oscillate the cooled zone to cause a thermo cycling of the area of the workpiece being affected by the surrounding ring 40. The use of ring 40 is a substantial advance over any known apparatus for progressing or moving a cooled zone axially along a workpiece being inductively heated.

In some installations, it is advisable to progressively increase the length of the cooled zone so that the heated workpiece is progressively cooled along its length without subsequent heating thereof. A modification of the present invention for accomplishing this function is illustrated in FIGURE 1A. A ring 70 having an internal coolant passage 72 is provided with an axial length substantially corresponding to the length of the coil 20. As the ring 70 is moved downwardly around the coil, the coil induces an ever increasing current flow within the ring. This creates a flux field $y'$ which generally corresponds in axial length to the length of the ring overlapping coil 20. This flux field $y'$ cancels the heating effect of flux field $x$ created by the coil 20. In this manner, the cooled zone C' progressively increases as the ring 70 moves downwardly over coil 20. This provides a convenient mechanism for progressively cooling the length of a workpiece, such as an elongated piece of semi-conductive material.

A further modification of the present invention is illustrated in FIGURES 3 and 4. In this modification, a conductive ring 80 is provided for axial movement in a telescoping fashion in the area between workpiece 10 and coil 20. Ring 80 is somewhat similar to ring 40, as shown in FIGURES 1 and 2, and it includes an internal coolant passage 82. Support arms 84, 86 are constructed so that they will allow complete movement of the ring 80 between the workpiece and coil without mechanical interference. An appropriate mechanism is provided for progressively moving ring 80 downwardly, or upwardly, along the coil 20. As previously explained, the field surrounding the coil 20 induces a current flow within ring 80. This current flow creates a flux field $y''$ which counteracts the flux field $x$ created by the coil 20. Consequently, the area of the workpiece 10 immediately adjacent the ring 80 is not heated to the same extent as the area of the workpiece not under the influence of ring 80. In this manner, progressive movement of the ring along the coil causes a progressive, corresponding movement of the cooled zones C'' along the workpiece, for purposes previously explained.

Figure 5:
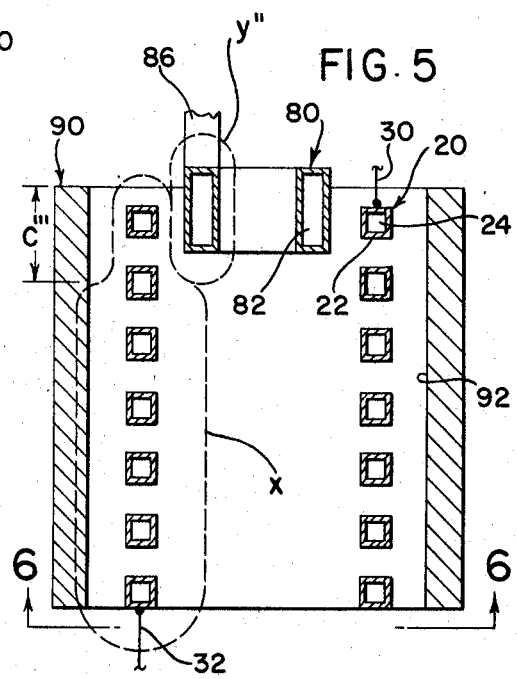
FIGURE 5 is a side cross-sectional view illustrating, somewhat schematically, a further modification of the present invention adapted for use with a hollow workpiece.
Figure 6:
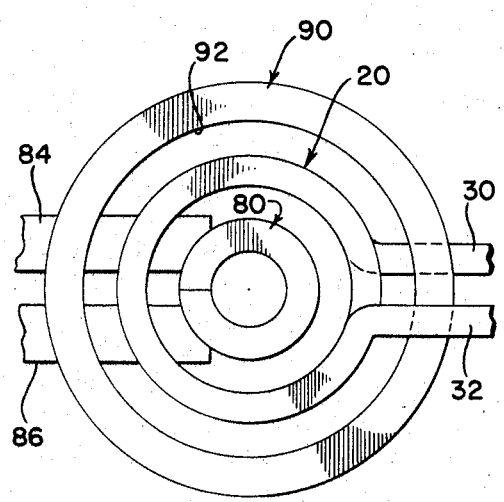
FIGURE 6 is an end view taken generally along line 6—6 of FIGURE 5.

In some instances, the workpiece to be heated and subjected to a progressively moving cooled zone may be hollow. An apparatus for performing the desired function on this workpiece is somewhat similar to the apparatus shown in FIGURES 3 and 4; however, the workpiece is mounted around the coil. Such a modification is illustrated in FIGURES 5 and 6. A workpiece 90 includes an inner cylindrical surface 92 generally facing the coil 20. Ring 80 having an induced flux field $y''$ is progressed axially through the coil. This decreases the flux field $x$ of the coil 20 adjacent the ring so that a cooled zone C''' is provided in the area of the workpiece 90 immediately opposite the ring 80. As the ring 80 is moved downwardly, by an appropriate mechanism, the cooled zone C''' is progressively moved downwardly along the inner surface 92. This performs the purifying, modifying or other function which is desired.

Figure 7:
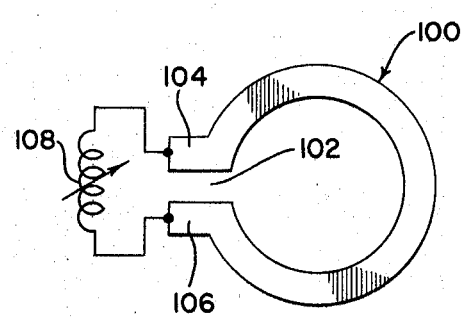
FIGURE 7 is a schematic view illustrating, somewhat schematically, a further modification of the present invention.

Referring now to FIGURE 7, a modified conductive ring 100 which can be used in any of the previously explained embodiments is illustrated. In accordance with this modification of the invention, the ring is interrupted at 102 to define spaced leads 104, 106. An adjustable impedance device 108 is then connected across the leads. The amount of current flow through the conductive ring 100 can be accurately controlled by the impedance varying device 108, which may take a variety of structural forms. For instance, it may be an adjustable shorting bar slidable upon the leads 104, 106, an adjustable inductor, or an adjustable capacitor.

The present invention has been described in connection with certain structural embodiments; however, it should be appreciated that various changes may be made in these embodiments without departing from the intended spirit and scope of the present invention as defined in the appended claims.

Having thus defined my invention, I claim:

1. In a device for inductively heating an elongated workpiece, said device comprising an inductor having input leads and being coextensive with said workpiece over a major portion of the workpiece length and a high frequency power supply connected across said input leads for energizing said inductor to heat said major portion of said workpiece length; the improvement comprising: an electrically conductive ring forming a low impedance path; said ring being telescopically mounted with respect to said coil, spaced radially from said coil, and directly coupled magnetically to said coil; and, means for progressively moving said ring coaxially along said coil to progress a cooled zone along said major length portion at a controlled rate.

2. The improvement as defined in claim 1 wherein said coil surrounds said workpiece and said ring surrounds said coil.

3. The improvement as defined in claim 1 wherein said ring surrounds said workpiece and said coil surrounds said ring.

4. The improvement as defined in claim 1 wherein said workpiece is hollow and surrounds said coil, and said coil surrounds said ring.

5. The improvement as defined in claim 1 including a variable impedance device within said low impedance path.

References Cited

UNITED STATES PATENTS 2,383,992   9/1945   Sherman _____ 219—10.79 X
2,386,819   10/1945  Sherman _____ 219—10.79

(Other references on following page)

UNITED STATES PATENTS

| | | | |
|---|---|---|---|
| 2,826,666 | 3/1958 | Cater | 13—1 |
| 2,856,499 | 10/1958 | Stanton et al. | 219—10.75 |
| 3,124,633 | 3/1964 | Van Run | 219—10.43 X |
| 3,153,717 | 10/1964 | Sommer | 219—10.75 |
| 3,209,114 | 9/1965 | McBrien | 219—10.75 |

RICHARD M. WOOD, *Primary Examiner.*

L. H. BENDER, *Assistant Examiner.*

U.S. Cl. X.R.

23—273; 219—10.79